United States Patent [19]

Teshima

[11] Patent Number: 4,550,795
[45] Date of Patent: Nov. 5, 1985

[54] EXHAUST SUPPORT SYSTEM

[75] Inventor: Hitoshi Teshima, Aichi, Japan

[73] Assignee: Toyota Jidosha Kabushiki Kaisha, Japan

[21] Appl. No.: 660,877

[22] Filed: Oct. 15, 1984

[30] Foreign Application Priority Data

Oct. 14, 1983 [JP] Japan .................. 58-193120

[51] Int. Cl.[4] .................... E21F 17/02; F16F 7/00
[52] U.S. Cl. ............................. 180/296; 248/60; 267/141; 267/153
[58] Field of Search ............. 248/634, 60, 610, 613; 180/297, 299, 309; 267/153, 141

[56] References Cited

U.S. PATENT DOCUMENTS

| | | | |
|---|---|---|---|
| 2,227,306 | 12/1940 | Guy | 248/613 |
| 2,267,431 | 12/1941 | Steensen | 248/60 |
| 2,869,811 | 1/1959 | Boschi | 267/153 X |

Primary Examiner—William E. Wayner
Attorney, Agent, or Firm—Parkhurst & Oliff

[57] ABSTRACT

An exhaust support system for a midship engine rear wheel drive-type vehicle having a transversely mounted engine. The exhaust support system has a cylindrical exhaust device which is provided in a lateral direction across the vehicle. The exhaust device is mounted to a vehicle body by a mounting device which has a bracket secured to the vehicle body, a support rod fixed to the exhaust device at one end thereof, and a resilient member contained within the bracket for absorbing vibrations of the exhaust system.

16 Claims, 10 Drawing Figures

EXHAUST SUPPORT SYSTEM

BACKGROUND OF THE INVENTION

The present invention relates to an exhaust support system for use in a midship engine rear wheel drive-type vehicle, and more particularly to an exhaust support system located between a vehicle body and an exhaust device such as a muffler or an exhaust pipe.

Figure 1:
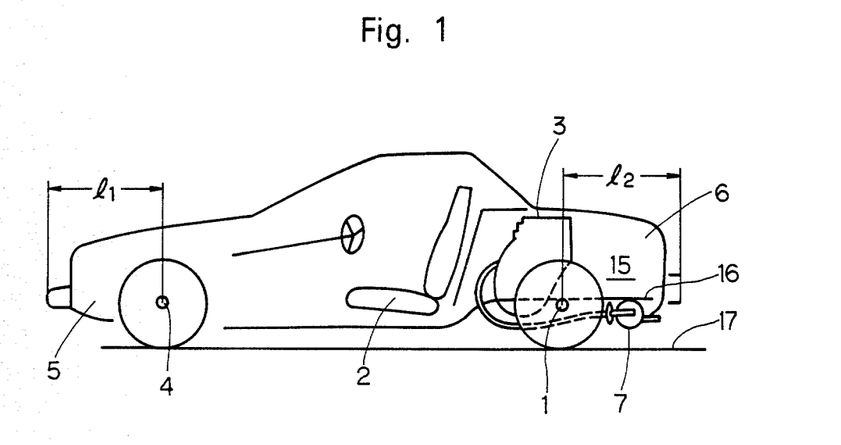
FIG. 1 is a side view of a midship engine rear wheel drive-type vehicle having a transversely mounted engine therein.
Figure 9:
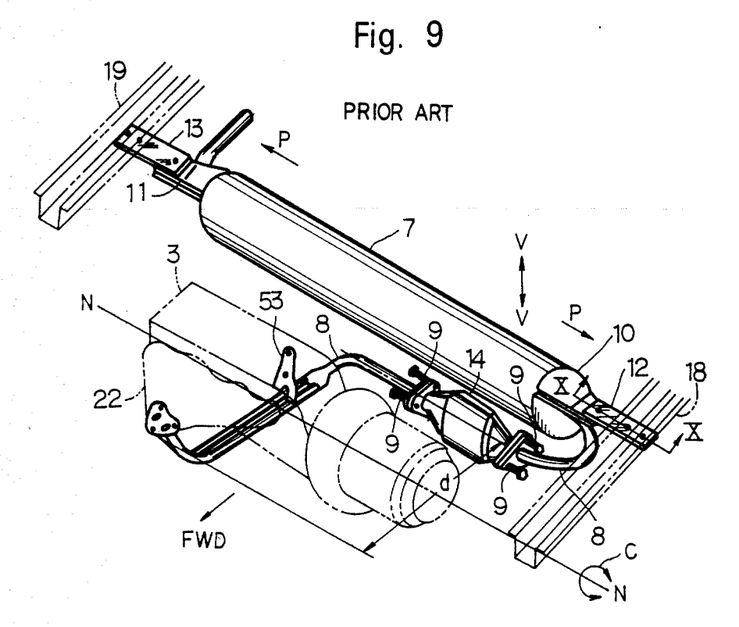
FIG. 9 is a perspective view of a known exhaust support system.

In general, a midship engine rear wheel drive-type vehicle, as shown in FIG. 1, is installed with an engine 3 located between a rear axle shaft 1 and a passenger seat 2. In such a vehicle, a nearly equivalent load is exerted on a front axle shaft 4 and the rear axle shaft 1. Hence, the steering control of this vehicle is superior to the steering control of other types of vehicles, resulting in midship engines being installed in many sports cars. To further improve the performance of the steering control in sports cars equipped with midship engines, the lengths $l_1$ and $l_2$ of a front overhang and a rear overhang 5 and 6, respectively, as shown in FIG. 1, are designed to be as short as possible. These short overhangs make it difficult to locate a muffler 7 parallel to the longitudinal direction of the vehicle under the rear overhang 6, because of the limited size of the rear overhang 6. Hence, in the midship engine rear wheel drive-type sports cars, the muffler 7 is positioned laterally across the vehicle, as shown in FIG. 9. The reference FWD in FIG. 9 designates a forward direction in the vehicle.

It is desirable to have large luggage compartments in all cars, including small sports cars. However, the lateral positioning of the muffler 7 across the vehicle body tends to limit the permissible size of a luggage compartment. Hence, the cylindrical muffler is maintained to be as small as possible for space purposes, while large enough to attenuate exhaust noise from the engine. This permits a floor 16 of the luggage compartment 15 to be as close to the ground as possible.

In a midship engine rear wheel drive-type vehicle, as shown in FIG. 1, the engine 3 is mounted at a position between the rear axle shaft 1 and the passenger seat 2. The engine 3 is transversely mounted, as shown in FIG. 9, because of the limited longitudinal length of the rear overhang 6. In a vehicle having a transversely mounted engine, the muffler 7 has been mounted onto the vehicle body through resilient members 12 and 13, which are flexible upwardly and downwardly with a small amount of force. FIG. 9 shows that the resilient members 12 and 13 are in the form of disc plates. The resilient members 12 and 13 are located on the same horizontal plane. One end of each of the members 12 and 13 is fixed to longitudinal ends 10 and 11 of the muffler 7, respectively. A second end of each of the members 12 and 13 is fixed to side members 18 and 19, respectively. The resilient members 12 and 13 are relatively thin in the direction in which they are upwardly and downwardly flexible and therefore bend quite easily in this direction (the upward and downward displacement corresponds to the arrows V—V in FIG. 9).

Figure 7:
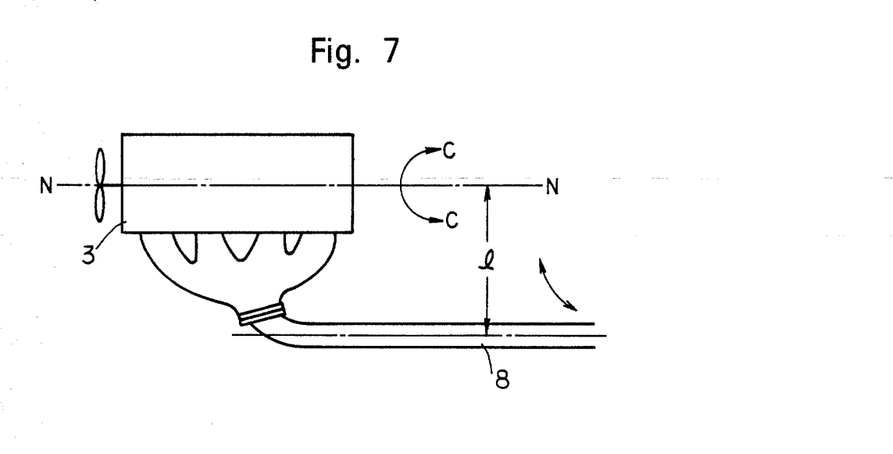
FIG. 7 is a top view which illustrates the positions of an engine and an exhaust pipe in a vehicle having a longitudinally mounted engine therein.
Figure 8:
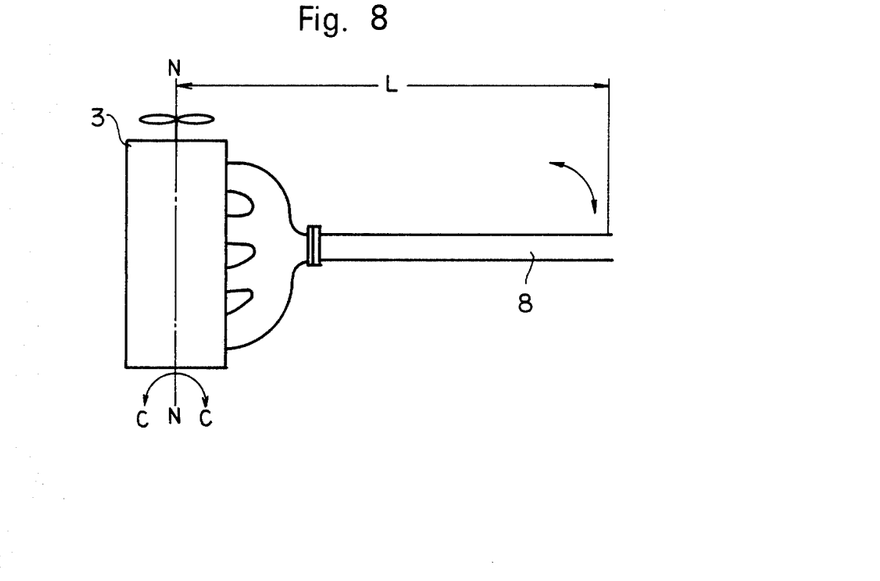
FIG. 8 is a top view which illustrates the positions of an engine and an exhaust pipe in a vehicle having a transversely mounted engine therein.

When the engine 3 is running, it rolls about the axial line N—N of a crank shaft (not shown in drawings) in the direction designated by an arrow C in FIG. 9. In a vehicle having a longitudinally mounted engine, as shown in FIG. 7, the distance "l" between the axial line of the crank shaft N—N and an axial line of the exhaust pipe 8 is small. While in a vehicle having a transversely mounted engine, as shown in FIG. 8, the distance "L" between the axial line N—N of the crank shaft and a tail end of the exhaust pipe 8 is large. Hence, in the vehicle having a transversely mounted engine, the exhaust pipe 8 amplifies the amplitude of the vibration of the engine roll (the vibration in the direction of the arrows C—C about the axial line N—N in FIG. 8). The amplified engine roll causes the muffler 7 to vibrate upwardly and downwardly with great amplitude. To attenuate this upward and downward vibration of the muffler 7, resilient members similar to the resilient members 12 and 13, have been utilized.

According to a known exhaust support system shown in FIG. 9, the resilient members 12 and 13 are designed to be thin in the upward and downward vibration direction thereof. When the vehicle body is upwardly and downwardly vibrated, because of the rough road conditions, the muffler 7 and a catalytic converter 14 also upwardly and downwardly vibrate. The muffler 7 and the catalytic converter 14 individually and collectively have a considerable weight, resulting in the amplitude of the upward and downward vibrations becoming considerable.

Further, when the vehicle body is upwardly and downwardly vibrated due to rough road conditions, the engine 3 does not always vibrate in phase with the muffler 7 and the catalytic converter 14. The engine 3 is mounted by an engine mount (not shown in drawings), which fixes the engine 3 to the vehicle body. The engine mount is hard in comparison to the resilient members 12 and 13. Hence, when the vehicle is upwardly and downwardly vibrated, the engine itself does not generate large upward and downward vibrations. Therefore, when the vehicle is upwardly and downwardly vibrated, a relative displacement occurs between the engine 3 and an exhaust device, such as the muffler 7. Further, a vibration absorbing device 9 is provided to absorb the vibrations of the engine 3. The vibration absorbing device 9 is limited in the amount of vibrations that it can absorb because of its limited size. Therefore, the vibration absorbing device 9 can be damaged by any substantial relative displacement between the engine 3 and the exhaust device.

Figure 10:
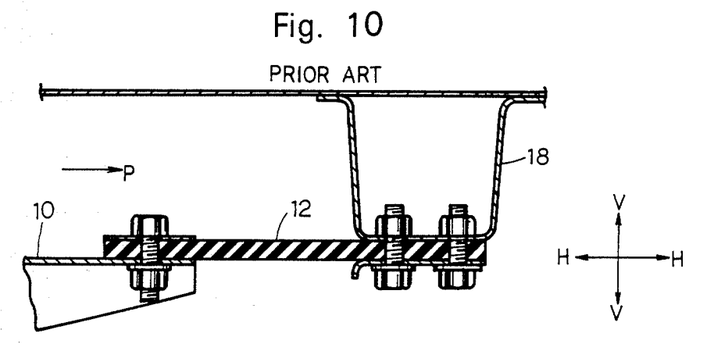
FIG. 10 is an enlarged cross-sectional view taken along the line X—X in FIG. 9.

Additionally, when the muffler 7 is heated from the engine exhaust, the thermal expansion of the muffler 7 in its longitudinal direction becomes significant. However, because both ends 10 and 11 of the muffler 7 are restricted by the resilient members 12 and 13, thermal expansion of the muffler 7 in its longitudinal direction (the direction of the arrow P in FIG. 9) is restricted. The restriction of the thermal expansion results in a compressive force being generated within the muffler 7. If the strain upon the muffler 7 caused by the compressive force is present for a long period of time, the muffler 7 might become plastically deformed, even though the resilient members 12 and 13 absorb a portion of the thermal expansion of the muffler 7. The resilient members 12 and 13 are located parallel to the direction of the arrow P in FIG. 9, which is parallel to the potential longitudinal thermal expansion of the muffler 7. This results in the resilient members 12 and 13 having a high stiffness in the direction of the arrow P in FIGS. 9 and 10. Hence, the resilient members 12 and 13 can absorb only a small portion of the longitudinal expansion of the muffler 7.

SUMMARY OF THE INVENTION

The present invention was made in view of the foregoing background and to overcome the foregoing drawbacks. It is accordingly an object of this invention to provide an exhaust support system which prevents exhaust devices from being damaged and prevents the plastic deformation of a muffler due to the longitudinal thermal expansion of the muffler.

To attain the above objects, an exhaust support system according to the present invention is applied in a midship engine rear wheel drive-type vehicle having a transversely mounted engine therein. The exhaust support system has a cylindrical exhaust device which extends laterally across the vehicle. An exhaust pipe connects the engine with the cylindrical exhaust device. The cylindrical exhaust device is mounted onto a vehicle body by a pair of brackets secured to the vehicle body, a resilient member provided within the bracket, and a support rod which is fixed to the cylindrical exhaust device at one end thereof and fixed to the resilient member at another end thereof. The resilient member is fixed to the bracket at horizontal portions thereof, thereby providing clearances between the resilient member and the vehicle body, and the resilient member and the bracket, in vertical directions thereof.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention. The same reference characters designate corresponding parts throughout the several views.

Figure 2:
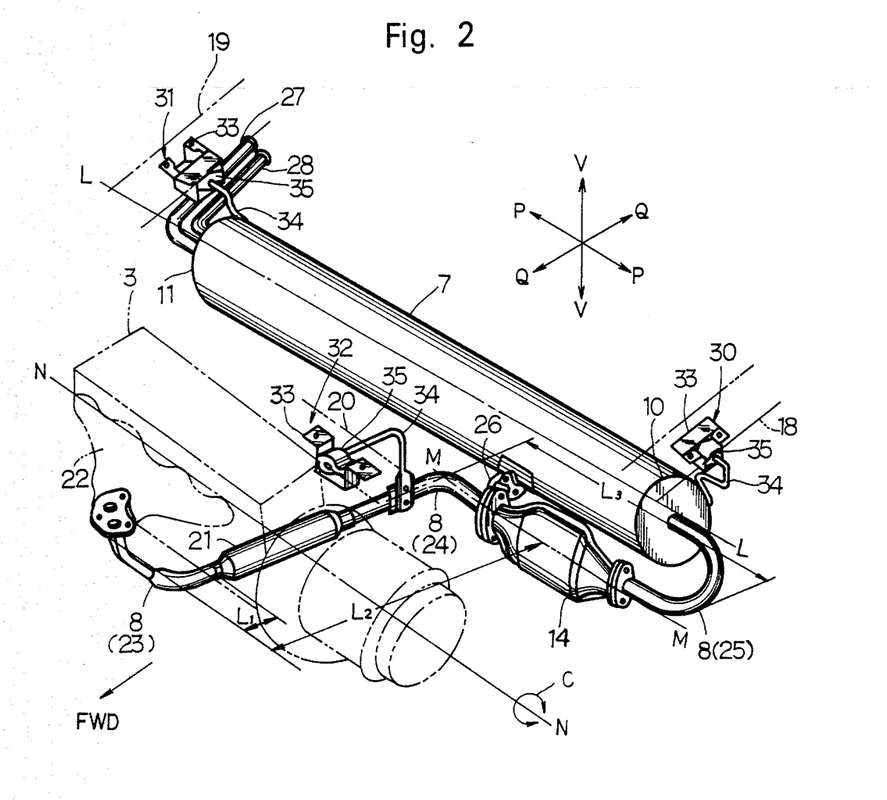
FIG. 2 is a perspective view of an exhaust support system according to an embodiment of the present invention.

FIG. 2 shows a perspective view of an exhaust support system according to an embodiment of the present invention. In FIG. 2, the numeral 3 designates an engine which is transversely installed in a vehicle. The exhaust gas of the engine 3 is supplied from an exhaust manifold 22 to a vibration absorbing device 21 through a front exhaust pipe 23. The vibration absorbing device 21 attenuates vibrations in the engine 3. The vibration absorbing device 21 is located at a position which is as close as possible to the engine 3, permitting the length of the front exhaust pipe 23 to be as short as possible. The front exhaust pipe 23 extends longitudinally along the vehicle. The vibration absorbing device 21 is connected through an intermediate exhaust pipe 24 with a catalytic converter 14, wherein the exhaust gas is purified. The catalytic converter 14 is connected by a rear exhaust pipe 25 with a muffler 7, wherein the noise of the exhaust gas is reduced. After the noise of the exhaust gas is reduced in the muffler 7, the exhaust gas is emitted through tail pipes 27 and 28 to the atmosphere. The exhaust device mounting structure shown in FIG. 2, is employed in a midship engine rear wheel drive-type vehicle, having a transversely mounted engine therein. In FIG. 2, the arrow FWD designates the forward direction in which the vehicle runs. The catalytic converter 14 has a cylindrical shape with an ovular cross-section and extends laterally across the vehicle. The catalytic converter 14 has an inlet opening and an outlet opening, at respective longitudinal ends thereof.

The muffler 7 has a cylindrical shape and extends laterally across the vehicle. The muffler 7 is provided with an inlet opening and an outlet opening at respective longitudinal ends thereof. The tail pipes 27 and 28 are connected with the outlet openings of the muffler 7.

The catalytic converter 14 is mounted alongside of the muffler 7 such that in the horizontal direction as the axial line M—M of the catalytic converter 14 is designed to be almost parallel to the axial line L—L of the muffler 7.

The intermediate exhaust pipe 24 communicates an outlet opening of the vibration absorbing device 21 with the inlet opening of the catalytic converter 14. As the intermediate exhaust pipe 24 approaches the catalytic converter 14 from the vibration absorbing device 21, the intermediate exhaust pipe 24 bends away from the longitudinal direction of the vehicle to a lateral direction in the vehicle. The rear exhaust pipe 25 connects the outlet opening of the catalytic converter 14 with the inlet opening of the muffler 7, and is bent in a U-shaped form.

The numeral 26 designates a bracket which fixes the catalytic converter 14 or the intermediate exhaust pipe 24 to the muffler 7.

The vibration absorbing device 21 comprises a flexible bellows tube in a cylindrical shape. The vibration absorbing device 21 absorbs the vibrations of the engine 3 by utilizing the flexibility of the bellows tube within the device 21. The device 21 prevents the vibration of the engine 3 from being transmitted through the exhaust pipe 8 to the catalytic converter 14 and the muffler 7.

The muffler 7 is mounted at its longitudinal ends by a first support device 30 and a second support device 31 onto a rear left side member 18 and a rear right side member 19, respectively.

The intermediate exhaust pipe 24 is mounted by a third support device 32 onto a rear cross member 20 at a position where the pipe 24 longitudinally extends in the vehicle and is located downstream from the vibration absorbing device 21. The support devices 30, 31 and 32 include brackets 33, support rods 34 and resilient members 35 for absorbing vibrations therein. The brackets 33 are fixed to the vehicle body on the rear left side member 18, the rear right side member 19 and the rear cross member 20. Each end of the support rod 34 is fixed onto the muffler 7 or the intermediate exhaust pipe 24.

Figure 3:
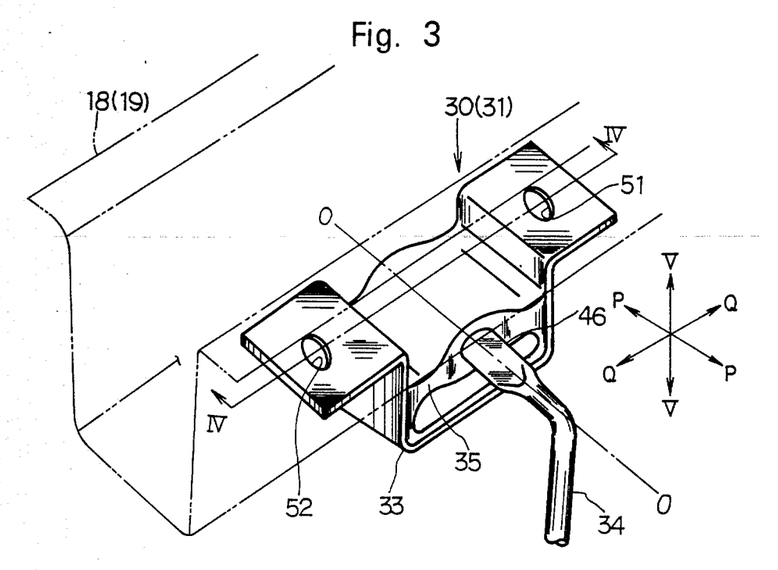
FIG. 3 is an enlarged perspective view of a first or second support device shown in FIG. 2.
Figure 4:
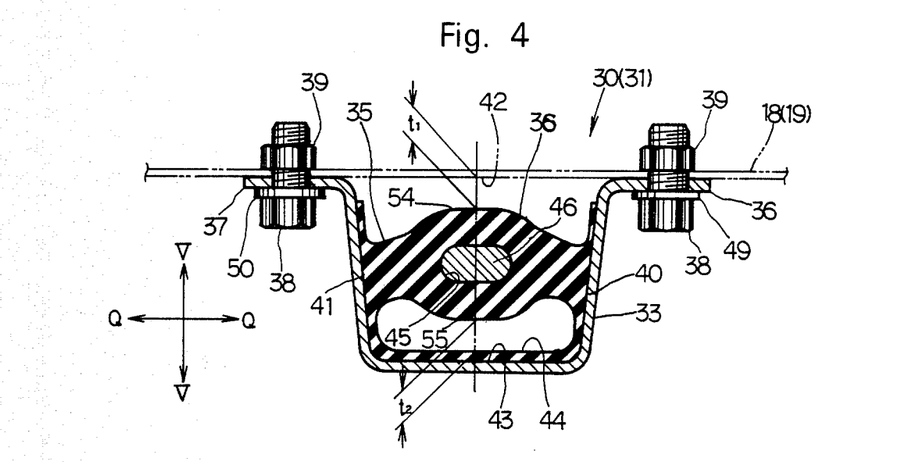
FIG. 4 is a cross-sectional view taken along the line IV—IV in FIG. 3.

FIG. 3 shows an enlarged perspective view of a first or second support device 30, 31 as shown in FIG. 2. FIG. 4 is a cross-sectional view taken along the line IV—IV in FIG. 3. As shown in FIG. 4, the bracket 33 has a cross-section which is U-shaped. The bracket 33 is fastened at both longitudinal ends 36 and 37, thereof to the rear left side member 18 or the rear right side member 19, by a combination of the bolts 38 and the nuts 39. Spring washers 49 and 50 are provided between the bolts 38 and the ends of the bracket 33. In FIG. 3, the bolts 38 and the nuts 39 are not shown. The brackets 33 are mounted onto the side members 18 or 19, such that a line connecting the bolt 38, mounted on the end 36, with the bolt 38, mounted on the end 37, is parallel to the longitudinal direction of the vehicle (the direction of the arrows Q—Q in FIG. 3). The resilient member 35 is made from a suitable rubber.

FIG. 4 shows that the resilient member 35 longitudinally extends in the vehicle, parallel to the direction of the arrows Q—Q. Both longitudinal ends 40 and 41 of the resilient member 35 are adhered to inner surfaces of the bracket 33, causing the resilient member to be vulcanized at both ends thereof. The resilient member 35 has spaces having predetermined openings $t_1$ and $t_2$. The space $t_1$ corresponds to a gap between the rear left side member 18 (or the rear right side member 19) and an upper portion 54. The resilient member 35, and the space $t_2$ corresponds to a gap between a central bent portion of the bracket 33 and a lower portion 55 of the resilient member 35.

A portion 42 of the rear left side member 18 (or the rear right side member 19) and a portion 43 of the bracket 33 facing the resilient member 35, function as stoppers which limit the upward and downward displacement of the resilient member 35. The stopper 43 of the bracket 33 is coated with rubber which connects with the resilient member 35. The resilient member 35 has an ovular opening 45 at a central portion thereof, the oval having a major axis extending in the longitudinal direction of the vehicle. The axial line O—O of the opening 45, shown in FIG. 3, extends laterally across the vehicle (the direction of the arrows P—P in FIG. 3). A tip end 46 of the support rod 34 is fitted into the oval opening 45. The tip end 46 of the support rod 34 also has an ovular cross section which is complementary to the cross section of the opening 45. The support rod 34 is mounted within the resilient member 35 such that it is slidable in the lateral direction (the direction of the arrows P—P in FIG. 3). Further, as shown in FIG. 4, the upper and lower surfaces 54 and 55 of the resilient member 35 are provided in a parallel relationship to the surfaces of the rear left side member 18 (or the rear right side member 19) and the longitudinal central portion of the bracket 33, respectively.

Figure 5:
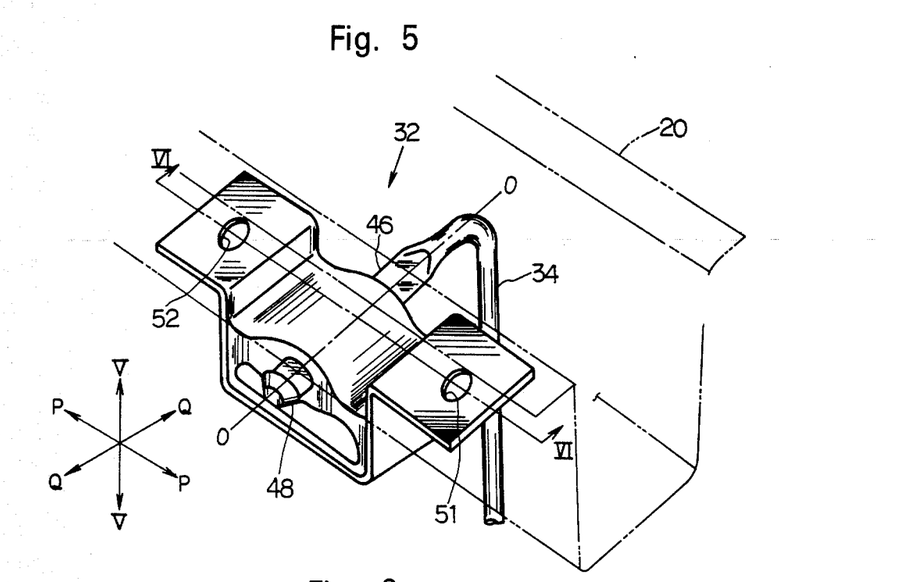
FIG. 5 is an enlarged perspective view of a third support device shown in FIG. 2.
Figure 6:
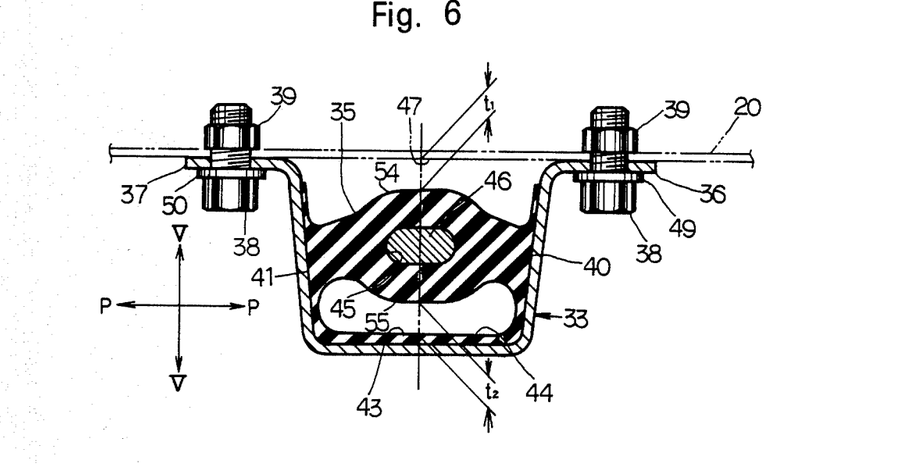
FIG. 6 is an enlarged cross-sectional view taken along the line VI—VI in FIG. 5.

FIG. 5 shows an enlarged perspective view of a third support device 32, shown in FIG. 2. FIG. 6 shows an enlarged cross-sectional view taken along the line VI—VI in FIG. 5. As shown in FIG. 6, the bracket 33 of the third support device 32 has a cross-section which is U-shaped. The bracket 33 is fastened at both longitudinal ends 36 and 37, thereof, to the rear cross member 20. Spring washers 49 and 50 are provided between the bolts 38 and the ends of the bracket 33. In FIG. 5, the bolts 38 and the nuts 39 are not shown. The bracket 33 of the third support device 32 is mounted such that a line connecting the bolt 38, mounted on the end 36 with the bolt 38, mounted on the other end 37, is parallel to the lateral direction across the vehicle (the direction of the arrows P—P in FIGS. 5 and 6). The resilient member 35 is made from a suitable rubber. FIG. 6 shows that the resilient member 35 latterally extends across the vehicle, parallel to the direction of the arrows P—P. Both ends 40 and 41 of the resilient member 35 are adhered to inner surfaces of the bracket 33, causing the resilient member to be vulcanized at both ends thereof. The resilient member 35 has spaces having predetermined openings $t_1$ and $t_2$. The space $t_1$ corresponds to a gap between the rear cross member 20 and an upper portion 54 of the resilient member 35, and the space $t_2$ corresponds to a gap between a central bent portion of the bracket 33 and a lower portion 55 of the resilient member 35.

A portion 47 of the rear cross member 20 and a portion 43 of the bracket 33 facing the resilient member 35, function as stoppers which limit the upward and downward displacement of the resilient member 35. The stopper 43 of the bracket 33 is coated with rubber which connects with the resilient member 35. The resilient member 35 has an ovular opening 45 at a central portion thereof, the oval having a major axis extending in the lateral direction across the vehicle (the direction of the arrows P—P). The axial line O—O of the opening 45 shown in FIG. 5, extends in the longitudinal direction of the vehicle (the direction of the arrows Q—Q in FIG. 5). A tip end 46 of the support rod 34 is fitted into the oval opening 45. The tip end 46 of the support rod 34 also has an ovular cross section which is complementary to the cross section of the opening 45. The support rod 34 is mounted within the resilient member 35 such that it is slidable in the longitudinal direction (the direction of the arrows Q—Q in FIG. 5). Further, as shown in FIG. 6, the upper and lower surfaces 54 and 55 of the resilient member 35 are provided in a parallel relationship to the surfaces of the rear cross member 20 and the central portion of the bracket 33, respectively.

An expanded portion 48 is provided at the tip end 46 of the support rod 34 to prevent the tip end 46 from sliding out of the opening 45. The first and second support devices 30 and 31 shown in FIGS. 2-4, also have expanded portions at their respective tip ends.

In the above-described exhaust support system, as shown in FIGS. 3 and 4, the resilient members 35 of the first and second support devices 30 and 31 are fixed to the bracket 33 exclusively at their respective longitudinal ends 40 and 41. The provided spaces between the upper surface 54 of the resilient member 35 and the vehicle body (the rear left side member 18 or the rear right side member 19), and between the lower surface 55 of the resilient member 35 and the bracket 33, result in the resilient member 35 being very flexible in the upward and downward directions (the direction of the arrows V—V in FIG. 4). Hence, the resilient member 35 efficiently absorbs the upward and downward vibrations of both of the muffler 7 and the catalytic converter 14, caused by the rolling vibration of the engine 3 (the vibration in the direction C about the axial line N—N in FIG. 2). However, the largest upward and downward displacement of the resilient member 35 is limited by the distances $t_1$ and $t_2$.

The support rods 34 of the first and second support devices 30 and 31 are fitted into the resilient members 35 such that the support rods 34 are laterally slidable against the resilient member 35, across the vehicle (i.e., the direction of the arrows P—P). Therefore, this assembly compensates for any thermal expansion in the muffler assembly, thereby eliminating any longitudinal compressive stresses in the muffler to prevent plastic deformation of the muffler. This is a significant improvement over any previously known designs for exhaust systems.

According to the prior exhaust support system shown in FIG. 9, the vibration absorbing device 9 is provided at the position which is close to the muffler 7, and the distance "d" between the exhaust manifold 22 and the vibration absorbing device 21 is large.

Conversely, according to the present invention, the vibration absorbing device 21, as shown in FIG. 2, is mounted at a position which is very close to the engine 3, as compared to the vibration absorbing device 9 in FIG. 9, and the distance "$L_1$" between the exhaust manifold 22 and the vibration absorbing device is much shorter than the distance "d" in FIG. 9.

Generally speaking, any object which is attached to an engine and can therefore be subjected to the rolling movement of the engine, the further away that the attached object is from the engine, the greater the displacement of the object because of the lever principle. Therefore, if a vibration absorbing device is positioned at a great distance, relatively speaking, away from the engine, the vibration absorbing device will have a difficult time attenuating all vibrations. Therefore, it is desirable to position the vibration absorbing device as close to the engine as possible. The known exhaust support system disclosed in FIG. 9, has a vibration absorbing device 9 which is located a great distance from the engine 3 and will therefore suffer from the above-discussed defects. Whereas the vibration absorbing device 21 of the present invention is located substantially closer to the engine 3 and will not suffer from the above-discussed disadvantages.

The distance "$L_2$" shown in FIG. 2 between the exhaust manifold 22 and the catalytic converter 14 is relatively long. To prevent the exhaust device and pipes from lowering toward the ground, the third support device 32 attaches to the intermediate exhaust pipe downstream of the vibration absorbing device 21. The total length $L_2$ of the first and second exhaust pipes 23 and 24 and the vibration absorbing device 21 is relatively long. Hence, when the temperature of the first and second exhaust pipes 23 and 24 and the vibration absorbing device 21 increases, due to the hot engine exhaust, the total amount of thermal expansion of the pipes 23, 24 and the device 21 can be considerable. According to the present embodiment, the support rod 34 of the third support device 32 is mounted within the oval opening of the resilient member 35, such that it is slidable in the longitudinal direction of the vehicle, i.e., slidable in the longitudinal direction of the first and second exhaust pipes 23 and 24. The first and second exhaust pipes 23, 24 and the vibration absorbing device 21 expand according to increasing temperatures. Hence, the first and second exhaust pipes 23, 24 and the vibration absorbing device 21 are not subjected to plastic deformation because the support rod 34 is slidable within the resilient member 35.

In FIG. 2, the total length $L_3$ of the second and third exhaust pipes 24 and 25, when measured in the lateral direction of the vehicle, and the catalytic converter 14, is also relatively long. The second and third exhaust pipes 24, 25 and the catalytic converter 14 similarly expand in the lateral direction across the vehicle (the direction of the arrows P—P) according to an increase in temperature. This lateral expansion direction is the same direction that the muffler 7 will expand. The muffler 7 is mounted by the first and second support devices 30 and 31 to permit the muffler 7 to expand substantially unrestrained. Hence, the portions corresponding to the length $L_3$, shown in FIG. 2, can expand in accordance with increases in temperature. Hence, the intermediate and rear exhaust pipes 24, 25 and the catalytic converter 14 are not subjected to any plastic deformation due to this thermal expansion.

Further, according to the present invention, as shown in FIGS. 4 and 6, the tip ends of the support rods 34 of the first, second and third support devices 30, 31 and 32 have cross-sections which are ovular. The direction of the major axis of the oval is parallel to the bracket 33, the rear left side member 18, the rear right side member and the rear cross member 20, respectively. Further, the upper and lower surfaces 54 and 55 of the resilient member 35 are almost parallel to the bracket 33, the rear left side member 18, the rear right side member 19 and the rear cross member 20, respectively. Hence, even when the resilient member 35 is upwardly or downwardly displaced, along the support rod 34, and strikes against the stoppers 42, 43 and 47, this impact is distributed to the vehicle body. Hence, the rubber comprising the resilient member 35 is not damaged.

While the present invention has been described in its preferred embodiments, it is to be understood that the invention is not limited thereto, and may be otherwise embodied within the scope of the following claims.

What is claimed is:

1. An exhaust support system for a midship engine rear wheel drive-type vehicle having a transversely mounted engine, comprising:

a cylindrical exhaust device extending in a lateral direction across the vehicle, having an inlet passage and an outlet passage;

an exhaust pipe having an inlet passage communicated with the engine and outlet passage communicated with said inlet passage of the exhaust device;

a first and a second mounting means for mounting said cylindrical exhaust device onto a body portion of the vehicle, each of said mounting means comprising:

a bracket secured onto the vehicle body portion;

a resilient member having an upper surface and a lower surface, said resilient member being contained within said bracket such that the resilient member is fixed to said bracket at vertical portions thereof and a vertical clearance is provided between said upper surface on the resilient member and said vehicle body portion and a vertical clearance is provided between said lower surface of the resilient member and said bracket; and a support rod fixed to said cylindrical exhaust device at one end thereof and a second end is slidably fixed to said resilient member at a second end thereof.

2. The exhaust support system of claim 1, wherein said first mounting means is provided adjacent said inlet passage of said exhaust device and said second mounting means is provided adjacent said outlet passage of said exhaust device.

3. The exhaust support system of claim 1, wherein said cylindrical exhaust device is a muffler for attenuating exhaust noise emitted from said engine.

4. The exhaust support system of claim 3, wherein said exhaust pipe comprises a first exhaust pipe having an inlet passage and an outlet passage, said inlet passage communicating with said engine at one end thereof, and a second exhaust pipe having an inlet passage and an outlet passage, said inlet passage communicating with said outlet passage of said first exhaust pipe and said outlet passage communicating with said muffler, whereby said first exhaust pipe longitudinally extends in the vehicle and said second exhaust pipe laterally extends across the vehicle.

5. The exhaust support system of claim 4, wherein the exhaust support system further comprises a third mounting means for mounting said first exhaust pipe to said vehicle body, said third mounting means comprising:
- a bracket secured onto the vehicle body portion,
- a resilient member having an upper surface and a lower surface, said resilient member being contained within said bracket such that the resilient member is fixed to said bracket at vertical positions thereof and a vertical clearance is provided between said upper surface on the resilient member and said vehicle body portion and a vertical clearance is provided between said lower surface of the resilient member and said bracket; and
- a support rod fixed to said first exhaust pipe at one end thereof and a second end being slidably fixed to said resilient member at a second end thereof.

6. The exhaust support system of claim 5, wherein said resilient member has an opening therein and one end of said support rod is slidably fitted into said opening of said resilient member.

7. The exhaust support system of claim 6, wherein said opening has an oval shaped cross-section.

8. The exhaust support system of claim 7, wherein said resilient member is thin in a vertical direction thereof compared with a longitudinal thickness thereof.

9. The exhaust support system of claim 8, wherein said bracket is U-shaped.

10. The exhaust support system of claim 9, wherein said resilient member is vulcanized where said resilient member is fixed to said bracket at said vertical positions.

11. An exhaust support system for a midship engine rear wheel drive-type vehicle having a transversely mounted engine, comprising:
- a cylindrical exhaust device extending in a lateral direction across the vehicle, having an inlet passage and an outlet passage;
- an exhaust pipe having an inlet passage communicated with the engine and outlet passage communicated with said inlet passage of the exhaust device;
- a first and a second mounting means for mounting said cylindrical exhaust device onto a body portion of the vehicle, each of said mounting means comprising:
  - a U-shaped bracket secured onto the vehicle body portion;
  - a resilient member having an upper surface and a lower surface, said resilient member being contained within said bracket such that the resilient member is fixed to said bracket at vertical positions thereof and a vertical clearance is proviced between said upper surface on the resilient member and said vehicle body portion and a vertical clearance is provided between said lower surface of the resilient member and said bracket; and
  - a support rod fixed to said cylindrical exhaust device at one end thereof and a second end being slidably fixed to said resilient member at a second end thereof.

12. An exhaust support system for a midship engine rear wheel drive-type vehicle having a transversely mounted engine, comprising:
- a cylindrical muffler for attenuating exhaust noise emitted from the engine, said muffler extending in a lateral direction across the vehicle, said muffler also having an inlet passage and an outlet passage;
- a first exhaust pipe having an inlet passage and an outlet passage, said inlet passage communicating with said engine at one end thereof, and a second exhaust pipe having an inlet passage and an inlet passage and an outlet passage, said inlet passage communicating with said outlet passage of said first exhaust pipe and said outlet passage communicating with said muffler, whereby said first exhaust pipe longitudinally extends in the vehicle and said second exhaust pipe laterally extends across the vehicle;
- a first and a second mounting means for mounting said cylindrical exhaust device onto a vehicle body portion of the vehicle, each of said mounting means comprising:
  - a bracket secured onto the vehicle body portion;
  - a resilient member having an upper surface and a lower surface, said resilient member being contained within said bracket such that the resilient member is fixed to said bracket at vertical positions thereof and a vertical clearance is proviced between said upper surface of the resilient member and said vehicle body portion and a vertical clearance is provided between said lower surface of the resilient member and said bracket; and
  - a support rod fixed to said muffler at one end thereof and a second end being slidably fixed to said resilient member at a second end thereof; and
- a third mounting means for mounting said first exhaust pipe to said vehicle body, said third mounting means comprising:
  - a resilient member having an upper surface and a lower surface, said resilient member being contained within said bracket such a that the resilient member is fixed to said bracket at vertical positions thereof and a vertical clearance is provided between said upper surface of the resilient member and said vehicle body portion and a vertical clearance is provided between said lower surface of the resilient member and said bracket; and
  - a support rod fixed to said first exhaust pipe at one end thereof and a second end thereof.

13. The exhaust support system of claim 12, wherein said bracket is U-shaped.

14. The exhaust support system of claim 13, wherein said resilient member has an opening therein and one end of said support rod is slidably fitted into said opening of said resilient member.

15. The exhaust support system of claim 14, wherein said opening has an oval shaped cross-section.

16. The exhaust support system of claim 15, wherein said resilient member is thin in a vertical direction thereof compared with a longitudinal thickness thereof.

* * * * *